(12) United States Patent
Benedikt et al.

(10) Patent No.: US 7,086,073 B2
(45) Date of Patent: Aug. 1, 2006

(54) OPTICAL STORAGE MEDIA WITH EMBEDDED SECURITY DEVICE

(75) Inventors: Mark Benedikt, Kirkland, WA (US); Timothy A. Rosemore, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 214 days.

(21) Appl. No.: 10/462,974

(22) Filed: Jun. 16, 2003

(65) Prior Publication Data

US 2004/0255317 A1 Dec. 16, 2004

(51) Int. Cl.
*G11B 7/24* (2006.01)

(52) U.S. Cl. .................................. 720/719

(58) Field of Classification Search ............ 720/719; 369/14; 235/454; 378/45; 349/106; 359/2, 359/738; 238/81
See application file for complete search history.

(56) References Cited

U.S. PATENT DOCUMENTS

| 5,696,758 | A | | 12/1997 | Yanagimachi et al. |
| 5,732,979 | A | * | 3/1998 | Finke et al. ................ 283/81 |
| 5,856,070 | A | * | 1/1999 | Korth ......................... 430/320 |
| 6,044,046 | A | * | 3/2000 | Diezmann et al. ............ 369/14 |
| 6,212,158 | B1 | | 4/2001 | Ha et al. |
| 6,226,109 | B1 | * | 5/2001 | Tompkin et al. ................ 359/2 |
| 6,476,888 | B1 | * | 11/2002 | Yamanashi .................. 349/106 |
| 6,545,823 | B1 | * | 4/2003 | Kitahara ..................... 359/738 |
| 6,850,592 | B1 | * | 2/2005 | Schramm et al. ............. 378/45 |
| 6,902,111 | B1 | * | 6/2005 | Han et al. .................... 235/454 |

FOREIGN PATENT DOCUMENTS

EP  0762392 B1  3/1997

OTHER PUBLICATIONS

Akkermans, T.H.M., and J.A.H. Kahlman, "Chip in Disc for Optical Storage," *Proceedings of the Joint International Symposium on Optical Memory and Optical Data Storage*, Waikoloa, Hawaii, Jul. 7-11, 2002, pp. 3-5.

Augot, D., et al., "Secure Delivery of Images Over Open Networks," *Proceedings of the IEEE* 87(7):1251-1266, Jul. 1999.

(Continued)

*Primary Examiner*—Tianjie Chen
(74) *Attorney, Agent, or Firm*—Christensen O'Connor Johnson Kindness PLLC

(57) ABSTRACT

An optical disk with an embedded security device, or wafer, is presented. The security device includes security features that enable the identification of genuine optical disks versus counterfeit optical disks. Methods for creating optical disks embedded with security devices are also presented. A security device is placed on the center pin of an open mold before the optical disk is formed. Alternatively, an optical disk having a cavity formed on a surface to receive a security device is created. A special mold with a raised platform creates the cavity on the optical disk. As a further alternative, two optical platters, each having a complementary cavity to accommodate a security device are created using a special mold having a raised platform. The security device is inserted into the complementary cavities and the optical platters and security device are bonded together.

18 Claims, 7 Drawing Sheets

OTHER PUBLICATIONS

Chen, D., "Status of Optical Disk Standards and Copy Protection Technology," *Proceedings of the SPIE-The International Society for Optical Engineering,* Taipei, Taiwan, Jul. 26-27, 2000, vol. 4081, pp. 8-16.

Dejneka, M.J., et al., "Rare Earth-Doped Glass Microbarcodes," *PNAS 100*(2):389-393, Jan. 21, 2003.

England, P., and M. Peinado, "Authenticated Operation of Open Computing Devices," *Proceedings of the Information Security and Privacy 7th Australian Conference,* Melbourne, Australia, Jul. 3-5, 2002, pp. 346-361.

Galante Block, D., "Rallying the Disc Patrol: Protection Schemes for CD and DVD," *EMedia Professional 11*(12):34-38 and 40-43, Dec. 1998.

Mikic-Rakic, M., and N. Medvidovic, "Architecture-Level Support for Software Component Deployment in Resource Constrained Enviornments," *Proceedings of the Component Deployment, IFIP/ACM Working Conference, CD 2002,* Berlin, Germany, Jun. 20-21, 2002, pp. 31-50.

Miller, R., "The Many Faces of DRM: Delivering Secure Enterprise Content," *EContent 25*(10):22-28, Oct. 2002.

Prostar, *Specification: Data Streaming, Robotics, Printing,* Rimage Corporation, Minneapolis, Minn., 2001.

"SafeDisc Technical Overview," *SafeDisc Whitepaper,* Macrovision Corporation, Santa Clara, Calif., 2002, pp. 1-16.

Sjölin, M., "State Driven Software Installation for Windows NT," *Proceedings of the 2nd Large Installation System Administration of Windows NT Conference,* Seattle, Washington, Jul. 16-17, 1999, pp. 27-36.

Thorwirth, N.J., et al., "Security Methods for MP3 Music Delivery," *Conference Record of the 34th Asilomar Conference on Signals, Systems and Computers,* Oct. 29-Nov. 1, 2000, Pacific Grove, Calif., vol. 2, pp. 1831-1835.

Waller, A.O., et al., "Securing the Delivery of Digital Content Over the Internet," *Electronics & Communication Engineering Journal 14*(5):239-248, Oct. 2002.

Yeo, W.-S., and J.-S. Lee, "Feasibility of Edge Delay Symbols for Copy Protection in Optical Disks," *Proceedings of the SPIE-The International Society for Optical Engineering,* Whistler, B.C., Canada, May 14-17, 2000, pp. 289-291.

Yoshioka, M., "IPR Protection Features for Optical Disks to Promote Superdistribution," *Proceedings of the Joint International Symposium on Optical Memory and Optical Data Storage,* Koloa, Hawaii, Jul. 11-15 1999, vol. 3864, pp. 83-85.

\* cited by examiner

OPTICAL STORAGE MEDIA WITH EMBEDDED SECURITY DEVICE

FIELD OF THE INVENTION

The present invention relates to optical storage media and, in particular, to optical storage media embedded with security devices.

BACKGROUND OF THE INVENTION

Counterfeiting is a problem for content providers. In the past, especially when using analog devices, counterfeits were typically inferior in quality to an authentic, or genuine, product. However, due in part to the advent of digital storage, counterfeits are now equal to, or nearly equal to, the authentic, or original, product in quality. Further compounding the problem for content providers is that optical media, upon which most digital content is delivered, is now relatively easy and inexpensive to duplicate. Additionally, many illicit counterfeiting operations generate counterfeited products that are increasingly difficult to distinguish from the genuine products.

As part of their anti-counterfeiting efforts, content providers have focused considerable effort at identifying counterfeited products. Some of these efforts include adding identification labels (that are difficult and costly to duplicate) to the packaging and, more recently, creating holograms on the reflective coating applied to the optical media. The ability to identify counterfeits is important to content providers as a large amount of counterfeits come through customs from areas of the world where counterfeiting is inexpensive, and perhaps even encouraged. Thus, if the content providers can identify the counterfeits as they pass through customs, such counterfeits can be confiscated and/or destroyed. As an added benefit to the identification efforts, the cost of creating counterfeits is increased. Theoretically, if the overall cost to counterfeit a genuine article were raised to a level where there was no profit in selling a counterfeit, no counterfeits would be produced.

Many areas of an optical disk are generally unused. For example, the hub area of an optical disk, i.e., the interior area of an optical disk surrounding the optical disk's center hole, is almost universally unused. With the exception of some printed artwork in this area, it is generally an area that is not utilized. No optically stored data is located within the hub area. Part of the reason that this area is unused is because this is the area that an optical disk drive uses to secure and rotate the disk while reading and/or writing.

SUMMARY OF THE INVENTION

A counterfeit-resistant optical disk is presented. The optical disk has a data area that stores optical data, and a non-data area that does not store optical data. A security device is embedded into the non-data area of the optical disk.

Methods for creating a counterfeit-resistant optical disk are also presented. According to one embodiment, a security device is positioned into an optical disk mold. The mold is closed, and an optical disk is formed in the closed mold, thereby embedding the security device in the optical disk. According to another embodiment, an optical disk, having a cavity formed on a surface of the disk is obtained. A security device is placed into the cavity and bonded to the optical disk. According to yet another embodiment, first and second optical platters are obtained. A security device is positioned between the first and second optical platters, and the optical platters are bonded together with the security device between them.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

For purposes of this discussion, an optical disk refers to any of the Compact Disk (CD) family of optical disks, including, but not limited to, CD-ROM, CD-R, and the like, as well as the Digital Video Disk (DVD) family of optical disks, including, but not limited to, DVD-ROM, DVD-R, and the like. Those skilled in the art will appreciate that other storage media, including other optical storage media and non-optical storage media, may realize similar benefits in applying the present invention. Additionally, as mentioned above, for purposes of this discussion, the hub area of an optical disk refers to the interior area of an optical disk surrounding the center hole. For example, in regard to a CD or DVD disk, the hub area is a concentric ring on the disk, having an inside diameter of 15.08 mm and an outside diameter of 34 mm, in accordance with the American National Standards Institute (ANSI) and the International Organization for Standardization (ISO) specifications.

Figure 1:
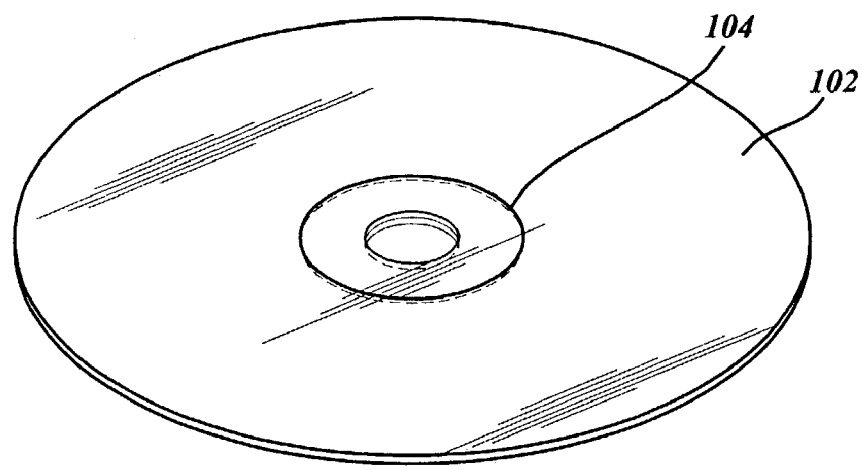
FIG. 1 is a pictorial diagram illustrating an exemplary optical disk having an embedded security wafer in the hub area of the disk, in accordance with the present invention.

FIG. 1 is a pictorial diagram illustrating an exemplary optical disk 102 having an embedded security wafer 104 in the hub area of the optical disk, in accordance with the present invention. As illustrated in FIG. 1, the security wafer 104 is embedded into the optical disk 102, and occupies the entire hub area of the disk. However, it should be noted that, while FIG. 1 illustrates that the security wafer 104 occupies the entire hub area, it is for illustration purposes only, and should not be construed as limiting upon the present invention. While the dimensions shown illustrate the maximum area for a security wafer 104, other dimensions for a security wafer may be used. Additionally, while embedding a security wafer 104 into the hub area of an optical disk may be a preferred embodiment of the present invention, other non-data bearing areas may also be utilized. For example, many optical disks are single-sided disks; thus, one side of the disk is a non-data bearing area. The outside edge of an optical disk is also typically a non-data bearing area. Both of these areas, as well as others, may be utilized, or in other words, embedded with a security wafer.

While the security wafer 104 is illustrated in FIG. 1, and in other figures, as a circular disk, it is also for illustrative purposes, and should not be construed as limiting upon the present invention. While a circular security wafer, such as the security wafer 104 shown in FIG. 1, makes optimal use of the hub area, other geometric shapes may used. These other geometric shapes may prove beneficial for anti-counterfeiting purposes, such as providing easily identifiable patterns, as well as proving more difficult to duplicate. It should be noted that the security wafer 104 should be embedded in the optical disk such that it has only minimal effects upon the balance and/or rotational dynamics of the optical disk. To achieve this minimal impact, in one embodiment the security wafer 104 is concentrically located on the optical disk.

Additionally, it should be further noted that while the following descriptions describe using a security wafer 104, it is illustrative only, and should not be construed as limiting upon the present invention. Other security devices that are not wafers may be used. For example, instead of a security wafer 104, a cylinder, bearing similar security features as the security wafer, may be used. Other shapes and forms may also be used, and are contemplated as falling within the scope of the present invention.

In accordance with aspects of the present invention, the security wafer 104 may include any number of security, or anti-counterfeiting, features. Examples of these security features placed on a security wafer 104 may include: encrypted, printed serial numbers; digital fingerprints or watermarks; holograms; polarized filters, photo-luminescent coatings (detectable by specially tuned lasers); microscopic taggants, i.e., microscopic markers not found in the base material but added to the base material to indicate the object's origin or authenticity; and radio-frequency identification (RFID) devices, to name just a few. Multiple features may be combined on a single security wafer 104. Additionally, any or all of the various security features may be combined in such a way as to uniquely identify each authentic optical disk 102, the content written onto the optical disk, or both.

While many materials may be suitable for use as a security wafer 104, such materials should not significantly increase the weight of the optical disk 102, such that the optical disk's mass falls outside of specified standards. Additionally, the security wafer 104 should be constructed and placed on the optical disk 102 so as to not cause an imbalance to occur when the disk is rotated. According to one embodiment, the base material of the security wafer is comprised of the same base material as that of the optical disk 102. For example, most CD and DVD disks are made of a base polycarbonate material. Thus, in one embodiment, the base material for the security wafer 104 is a like polycarbonate material.

According to embodiments of the present invention, because the security wafer 104 is embedded either fully or partially within the optical disk 102, the security wafer's thickness should be less than the thickness of the optical disk. For example, CD and DVD disks share the same standard thickness, 1.2 mm. Thus, the thickness of a security wafer 104 must be less than 1.2 mm. In one embodiment, the security wafer is 0.127 mm thick. Other thicknesses may also be used. According to an alternative embodiment (not shown), the security wafer 104 may be the same thickness as the optical disk 102 and include a center hole, and this security wafer is bonded to a specially formed optical disk, one formed to utilize such a security wafer as the hub area.

Figure 2:
FIG. 2 is a pictorial diagram illustrating a cross-section of an optical disk embedded with a security wafer, where the security wafer is embedded in the optical disk such that the top of the security wafer is flush with a surface of the optical disk.

According to one embodiment of the present invention, the top surface of the security wafer 104 is flush with a surface of the optical disk 102. FIG. 2 is a pictorial diagram illustrating a cross-section of an optical disk 102 embedded with a security wafer 104, where the security wafer is embedded in the optical disk such that the top of the security wafer is flush with a surface of the optical disk.

Figure 3:
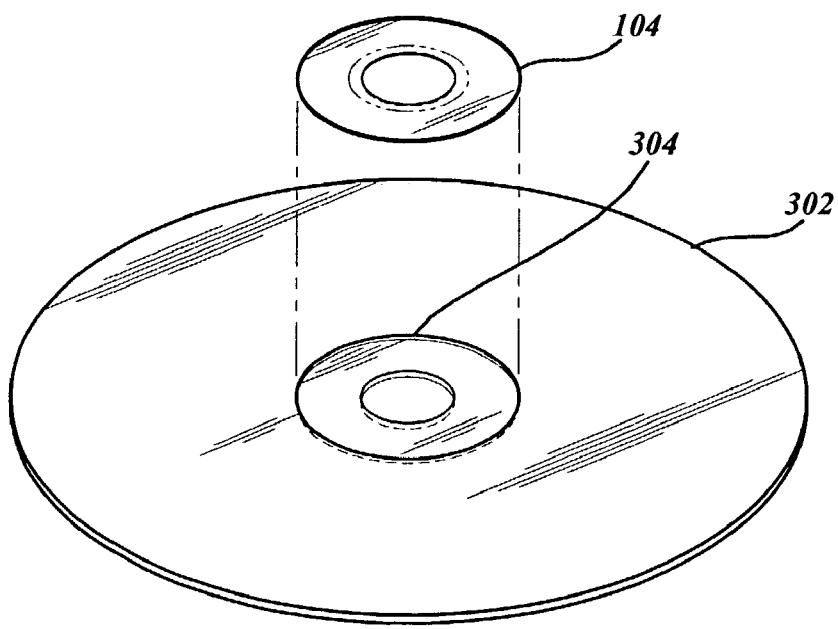
FIG. 3 is a pictorial diagram illustrating one exemplary manner of creating the optical disk embedded with a security wafer as shown in FIG. 2, using a specially molded optical disk.

FIG. 3 is a pictorial diagram illustrating one exemplary manner of creating the optical disk 102 embedded with a security wafer 104, as shown in FIG. 2, using a specially molded optical disk 302. The specially molded optical disk 302 includes a cavity 304 to accommodate the security wafer 104, and is molded using a specially formed mold as described in regard to FIG. 10. As will be described below in regard to FIG. 13, after a specially molded optical disk 302 is formed, the security wafer 104 is placed in the cavity 304 and is bonded to the specially molded optical disk 302.

Figure 4:
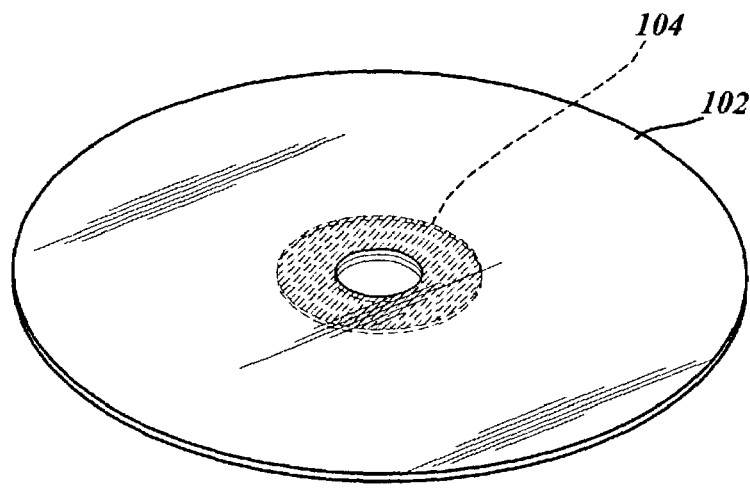
FIG. 4 is a pictorial diagram illustrating an optical disk having a security wafer embedded entirely within the optical disk substrate.

While a security wafer 104 may be partially embedded in an optical disk 102, such as described above in regard to FIG. 2, alternatively, the security wafer may be entirely embedded within the optical disk. FIG. 4 is a pictorial diagram illustrating an optical disk 102 having a security wafer 104 embedded entirely within the optical disk substrate. One advantage realized by entirely embedding the security wafer 104 within the optical disk 102 is that removing the security wafer from the optical disk completely destroys the hub area, rendering the optical disk unusable.

Figure 5:
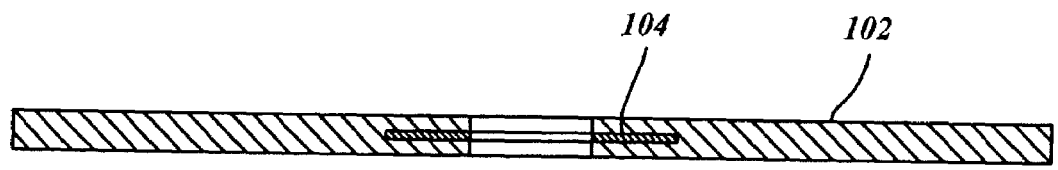
FIG. 5 is a pictorial diagram illustrating a cross-section of an optical disk having a security wafer embedded entirely within the optical disk substrate, as described above in regard to FIG. 4.

FIG. 5 is a pictorial diagram illustrating a cross-section of an optical disk 102 having a security wafer 104 embedded entirely within the optical disk substrate, as described above in regard to FIG. 4. As shown in FIG. 5, the optical disk substrate is found on either side of the security wafer. To create this embodiment, the security wafer 104 must be placed in the mold when the optical disk is created. This process is described in greater detail below in regard to FIG. 12.

Often, when the security wafer 104 is placed in the mold prior to forming the optical disk 102, the security wafer will "float" to one surface as the optical disk is formed, i.e., as the polycarbonate substrate is injected into the mold. In order to alleviate this situation, and to generally realize the benefits of an entirely embedded security wafer, a spacing device may be added to the security wafer.

Figure 6:
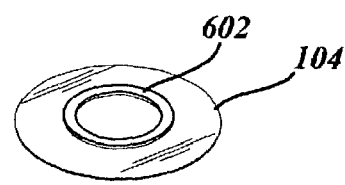
FIG. 6 is a pictorial diagram illustrating a security wafer with a spacing device on one side of the security wafer used to further embed the security wafer into the optical disk.

FIG. 6 is a pictorial diagram illustrating a security wafer 104 with a spacing device 602 on one side of the security wafer used to further embed the security wafer into the optical disk 102. Creating an optical disk 102 with a security wafer 104 having a spacing device 602 is substantially the same as creating an optical disk having a fully embedded security wafer, as described below in regard to FIG. 12. However, as the security wafer 104 tends to "float" to a surface during creation of the optical disk 102, the spacing device prevents the security wafer from reaching the optical disk's surface, and allows the optical disk's base material to almost entirely surround the security wafer.

The combined thickness of the spacing device and the security wafer must be less than the thickness of the optical disk. Typically, the thickness of the spacing device 602 is less than the thickness of the security wafer 104. For example, in one embodiment, the security wafer 104 is 0.127 mm thick, while the spacing device 602 is 0.100 mm thick. As shown in FIG. 6, the spacing device 602 may be a ring located on one surface of a security wafer 104. Other shapes may also be used, as well as multiple spacing devices. For example, a plurality of small disks may be appropriately located on the surface of the security wafer 104. When using a ring as the spacing device 602, as illustrated in FIG. 6, the inside diameter of the spacing device should correspond to the inside diameter of the hub area, i.e., 15.08 mm, as the optical disk's base material may not be able to flow into any cavity on the inside of the spacing device.

Figure 7:
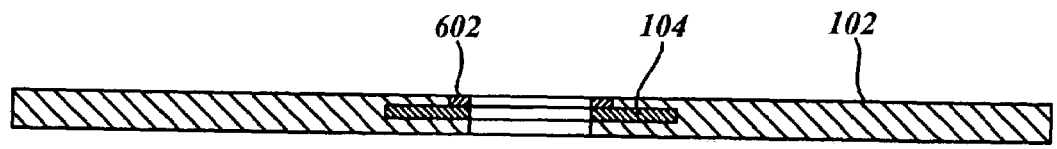
FIG. 7 is a pictorial diagram illustrating a cross-section of an optical disk embedded with a security wafer having a spacing device, and formed in the manner described in FIG. 4.

FIG. 7 is a pictorial diagram illustrating a cross-section of an optical disk 102 embedded with a security wafer 104 having a spacing device 602, and formed in the manner described in FIG. 4. As shown in FIG. 7, the spacing device 602 is flush with a surface of the optical disk 102. However, the security wafer 104 is almost entirely embedded within the optical disk base material. Thus, any attempts to remove the security wafer 104 from the optical disk will result in the destruction of the hub area, rendering the optical disk unusable.

Figure 8:
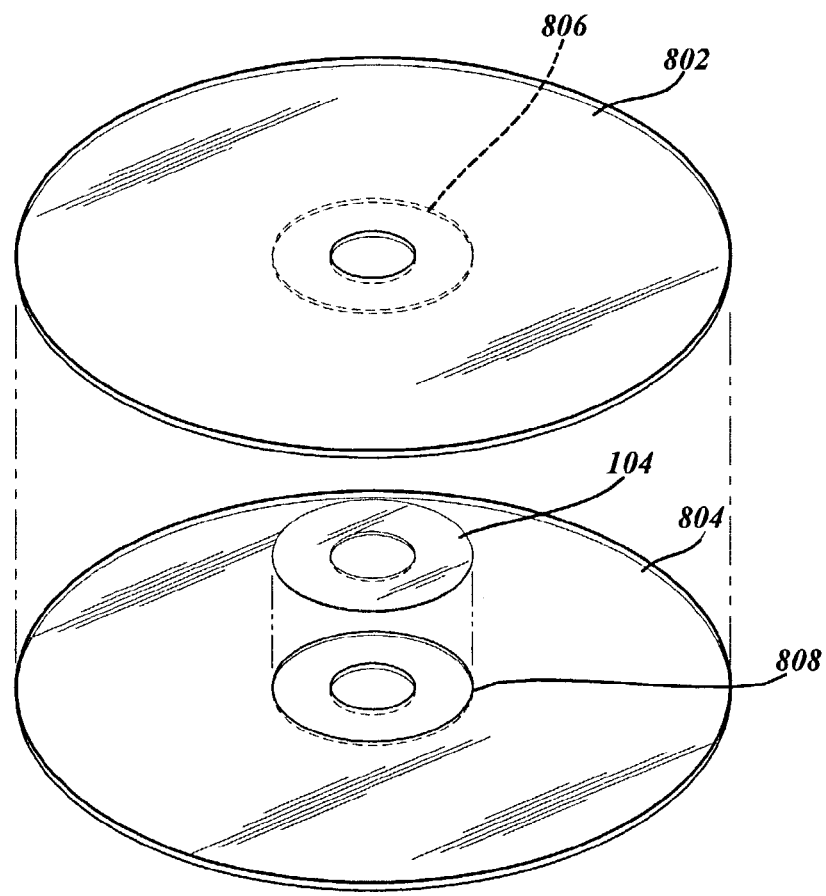
FIG. 8 is a pictorial diagram illustrating another exemplary manner of creating an optical disk embedded with a security wafer using two specially molded optical platters which, when combined with a security wafer, form a single optical disk.

FIG. 8 is a pictorial diagram illustrating another exemplary manner of creating an optical disk embedded with a security wafer using two specially molded optical platters, platter 802 and platter 804, which, when combined with a security wafer 104, form a single optical disk 102. Similar to the specially molded optical disk 302 of FIG. 3, the specially molded optical platters 802 and 804 are formed with a cavity, shown as cavity 806 and 808, to accept a security wafer 104. The specially molded optical platters 802 and 804 are bonded together with the security wafer 104 located in the cavities 806 and 808.

Figure 9A:
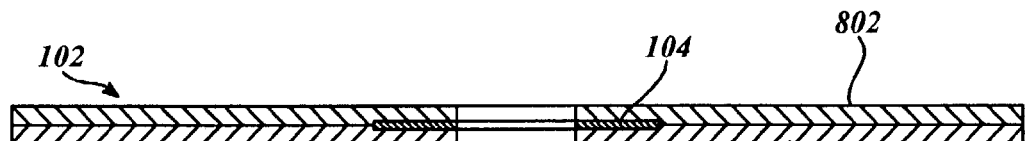
FIGS. 9A–9C are pictorial diagrams illustrating cross-sections of an optical disk embedded with a security wafer formed from bonding two optical platters.

FIG. 9A is a pictorial diagram illustrating a cross-section of an optical disk 102 embedded with a security wafer 104 formed according to the manner described above in regard to FIG. 8. As shown in this diagram, the security wafer 104 is generally located equally between the two specially molded optical platters 802 and 804 in the cavities 806 and 808.

Figure 9B:
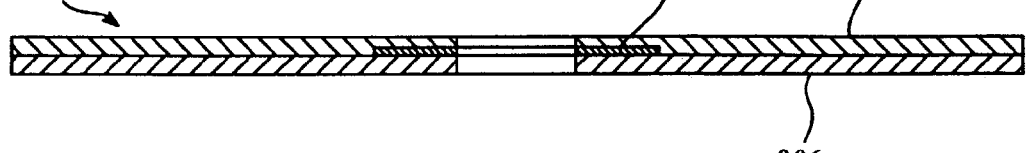

Alternatively (not shown), only one of the optical platters is specially molded with a cavity to accept a security wafer 104, while the other optical platter is a typical optical platter. FIG. 9B is a pictorial diagram illustrating a cross-section of the resulting optical disk 102 embedded with a security wafer 104 formed according to this alternative embodiment. As shown, the security wafer 104 is positioned in the cavity of the specially molded optical platter 802 and flush with the second, typical optical platter 806 when they are bonded together.

Figure 9C:
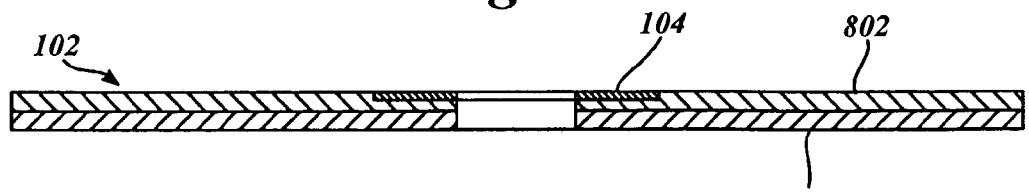

As yet a further alternative (not shown), one or both of the optical platters may be molded such that the security wafer 104 is flush with an outside surface of the resultant optical disk 102, i.e., after bonding the optical platters. FIG. 9C is a pictorial diagram illustrating a cross-section of an optical disk 102 with a security wafer 104 partially embedded in a specially molded optical platter 802, and flush with a surface of the resulting optical disk 102.

Those skilled in the art will recognize that DVD disks are commonly formed by bonding two optical platters together. Thus, the manner for creating an optical disk 102 embedded with a security wafer 104 described above in regard to FIGS. 8 and 9A–9C may be readily applied to creating DVD disks. However, it should be understood that the above-identified process should not be limited to creating DVD disks with an embedded security wafer 104. For example, while CD disks are typically created as a single platter, a CD disk embedded with a security wafer 104 may be created using two platters.

Figure 10:
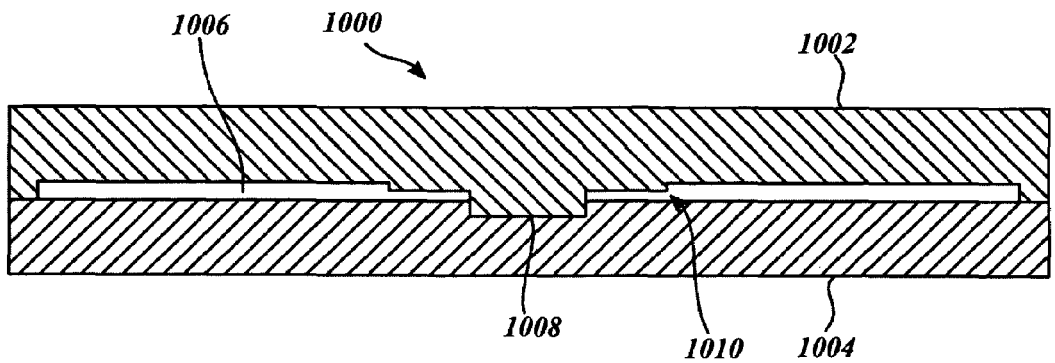
FIG. 10 is a pictorial diagram illustrating an exemplary mold specially formed for creating specially molded optical platters as described in regard to FIGS. 2 and 8.

As already mentioned, various embodiments of the optical disk 102 embedded with a security wafer 104 utilize a specially formed disk or platter having a cavity to accommodate the security wafer. FIG. 10 is a pictorial diagram illustrating a cross-section of an exemplary mold 1000 for creating the specially molded optical disks or platters, as described in regard to FIGS. 2 and 8. It should be understood, however, that, while FIG. 10 and the following discussion present some aspects of molds used for creating optical disks or platters, there are other aspects that are not included in this discussion, but are well known in the art.

As shown in FIG. 10, the mold 1000 is comprised of two halves, the top portion 1002, which has a center pin 1008, and the bottom portion 1004 that is capable of receiving the center pin when the mold is closed. When the two halves of the mold 1000 are closed, a cavity area 1006 is created. This cavity area 1006 is filled with the optical disk's base material to form the disk or platter. In contrast to a typical mold, the top portion 1002 shown in FIG. 10 includes a raised platform 1010 that forms the cavity in the specially formed optical disk or platter discussed above.

The height of this raised platform 1010 corresponds to the height of the security wafer 104, whether it is to be completely inserted into a single cavity, or shared between two cavities, such as described above in regard to FIGS. 8 and 9A. For example, a security wafer 104 is approximately 0.127 mm thick. Thus, in one embodiment, the raised platform 1010 should be a corresponding height to accommodate the security wafer when creating a specially formed optical disk 302 (FIG. 3). Alternatively, if the mold 1000 is used to create specially formed optical platters, such as platters 802 and 804 described in regard to FIG. 8, the height of the raised platform 1010 would be approximately 0.064 mm.

Figure 11A:
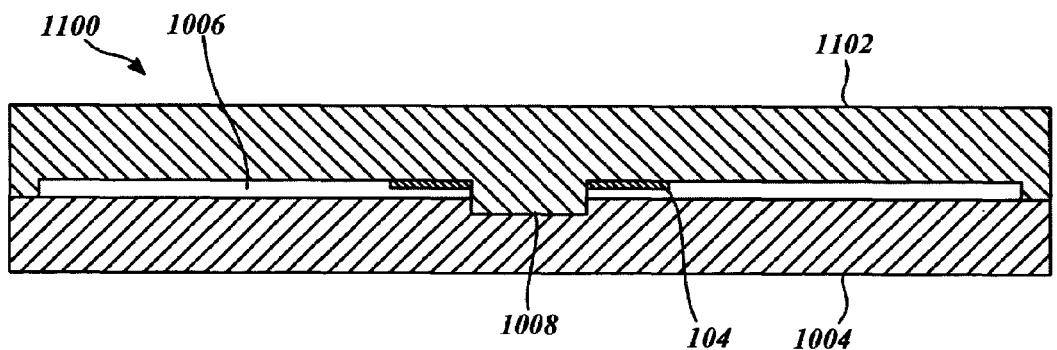
FIGS. 11A and 11B are pictorial diagrams illustrating cross-sections of an exemplary mold for creating optical disks, and having a security wafer placed on the center pin of the mold.

FIG. 11A is a pictorial diagram illustrating a cross-section of an exemplary mold 1100 for creating optical disks, and having a security wafer 104 placed on the center pin 1008 of the mold. The two halves of the mold 1100, the top portion 1102 and the bottom portion 1004, are typical of those found in the prior art. In contrast to the mold 1000 described above in regard to FIG. 10, the mold 1100, and in particular the top portion 1102, does not have a raised platform. Instead, this exemplary cross-section illustrates a security wafer 104 located on the center pin 1008. Placing the security wafer 104 on the center pin and subsequently forming the optical disk 102 is consistent with the process described above in regard to FIG. 5.

Figure 11B:
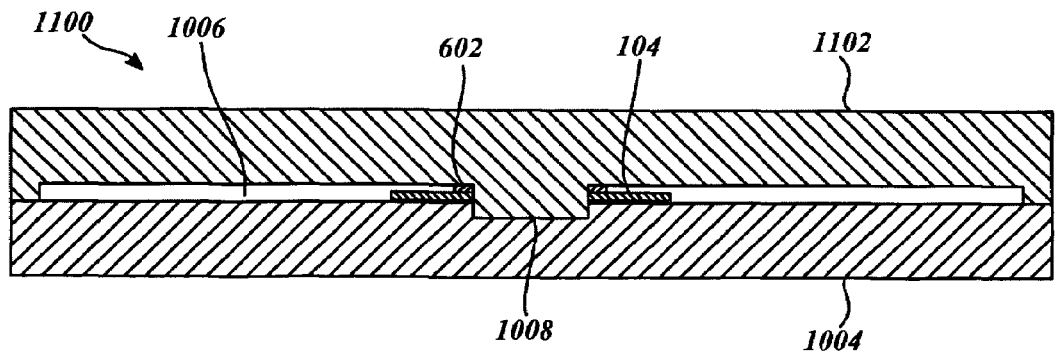
Figure 12:
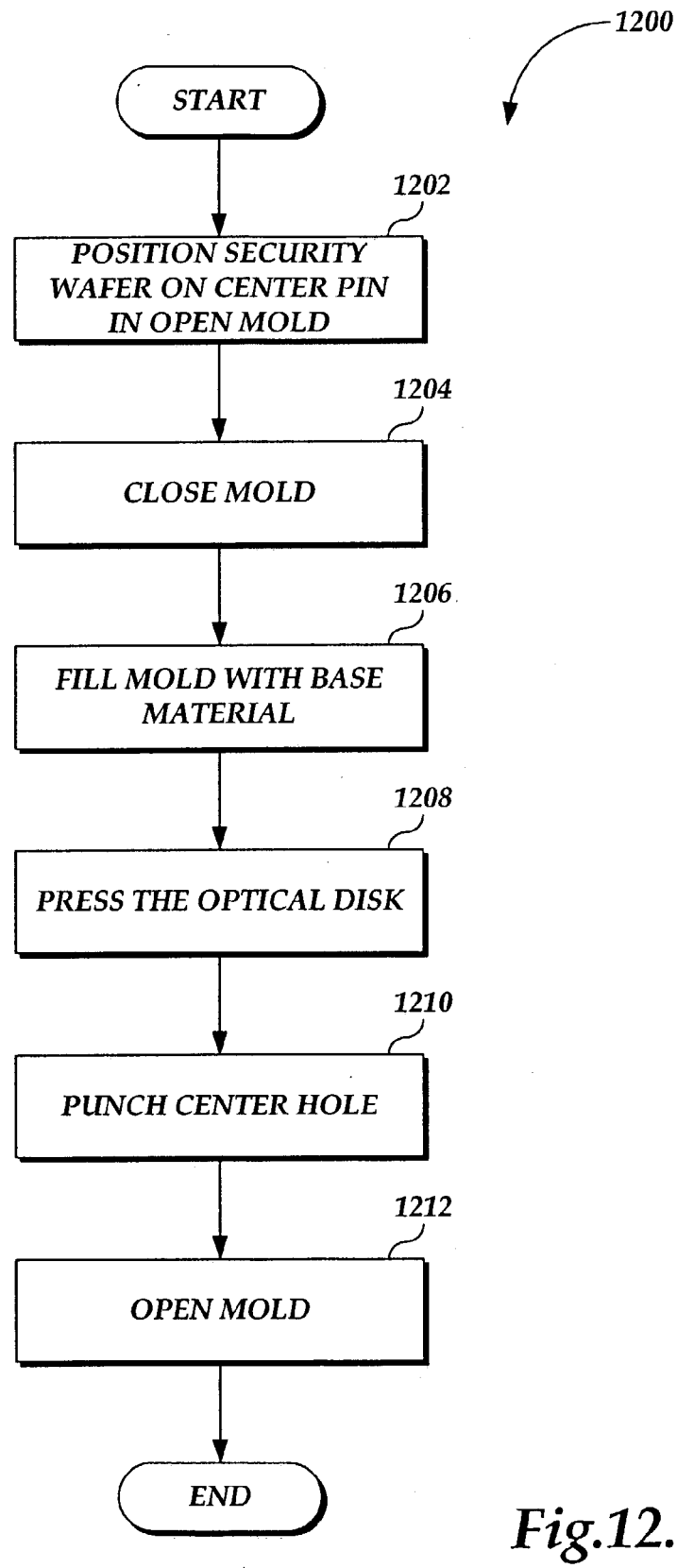
FIG. 12 is a flow diagram illustrating an exemplary process for creating an optical disk embedded with a security wafer using a typical optical disk mold, such as those illustrated in FIGS. 11A and 11B.

FIG. 11B is a pictorial diagram illustrating a cross-section of an exemplary mold 1100 for creating optical disks, and having a security wafer 104 with a spacer device 602 placed on the center pin 1008 in the mold. As shown in FIG. 12, by placing a spacing device 602 on the security wafer 104, the security wafer is prevented from "floating" to a surface of the optical disk or platter, thereby embedding the security wafer substantially within the base material.

FIG. 12 is a flow diagram illustrating an exemplary process 1200 for creating an optical disk 102 embedded with a security wafer 104 using a typical optical disk mold, such as those illustrated in FIGS. 11A and 11B. While certain aspects of the process for making optical disks are described herein, they are included for describing the novel aspects of creating an optical disk 102 embedded with a security wafer 104. Those skilled in the art will recognize that other steps, and combinations of steps, are involved with creating, or molding, an optical disk.

Beginning at block 1202, a security wafer 104 is positioned onto the center pin 1008 of an open mold, such as mold 1100 of FIG. 11A. The security wafer 104 may or may not have a spacing device 602 attached to its surface. According to an actual embodiment, a robotic arm positions the security wafer 104 onto the center pin 1008 in the open mold 1100. However, any number of other mechanisms for positioning the security wafer 104 onto the center pin 1008 may be utilized. After the security wafer 104, with or without a spacing device 602, is positioned onto the center pin 1008, at block 1204, the mold 1100 is closed.

At block 1206, the closed mold 1100 is filled with the base material. Typically, this material is a liquefied polycarbonate substrate, and filling the mold is performed by a well-known process referred to as injection molding. At block 1208, the optical disk 102 is pressed, typically via a hydraulic ram. Those skilled in the art will recognize that pressing the filled mold 1100 imprints data onto the optical media from corresponding data located on the inner surface of one of the mold halves.

At block 1210, the center hole of the formed optical disk is punched to removed any sprues that may have formed, and to ensure that the center hole is the proper dimension. At block 1212, the mold is opened and the optical disk 102 embedded with a security wafer 104 may be removed. Thereafter, the routine 1200 terminates. As previously mentioned, other steps may be taken to further prepare the optical disk 102 for delivery to an end user, such as coating the data area with a reflective substance, placing an exterior lacquer on the optical disk, printing labeling onto the optical disk, and the like.

Figure 13:
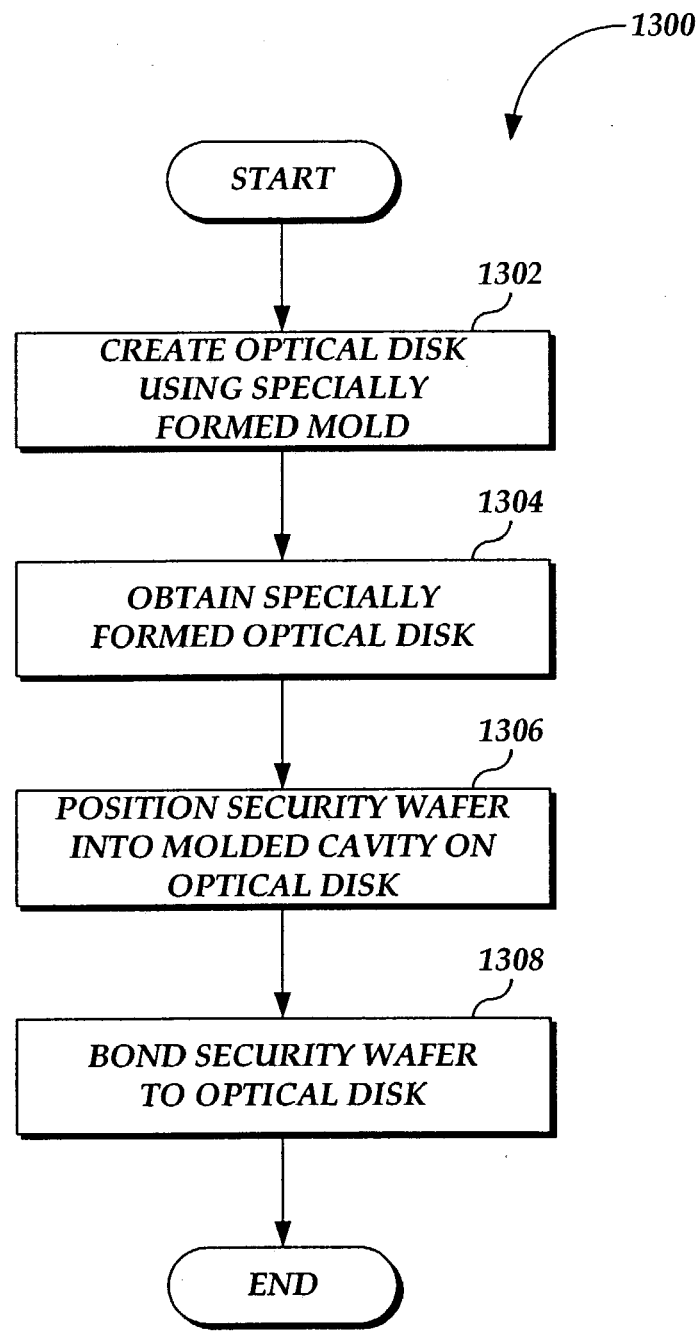
FIG. 13 is a flow diagram illustrating an exemplary routine for creating an optical disk embedded with a security wafer using specially formed optical disks, such as those described in regard to FIG. 3.

The routine 1200 described in FIG. 12 is directed at one embodiment for creating an optical disk 102 embedded with a security wafer 104 by placing the security wafer in the open mold 1100. Alternatively, FIG. 13 is a flow diagram illustrating an alternative exemplary routine 1300 for creating an optical disk 102 embedded with a security wafer 104 using specially formed optical disks or platters, such as those described in regard to FIG. 3.

Beginning at block 1302, a specially formed optical disk, such as optical disk 302, having a cavity 304 to accept a security wafer 104 is created. Specially formed optical disks may be created using the mold 1000 having a raised platform 1010, described above in regard to FIG. 10. Other methods or molds may also be used, such as utilizing a special stamp within the mold. At block 1304, the specially formed optical disk 302 is obtained. At block 1306, a security wafer 104 is positioned into the cavity 304 found on the optical disk 302. At block 1306, the security wafer 104 is bonded to the optical disk 302. Thereafter the routine 1300 terminates. As with the routine 1200 of FIG. 12, those skilled in the art will recognize that other steps that are not described herein, and not directly related with embedding the security wafer 104 in the optical disk 302, may also be taken.

Figure 14:
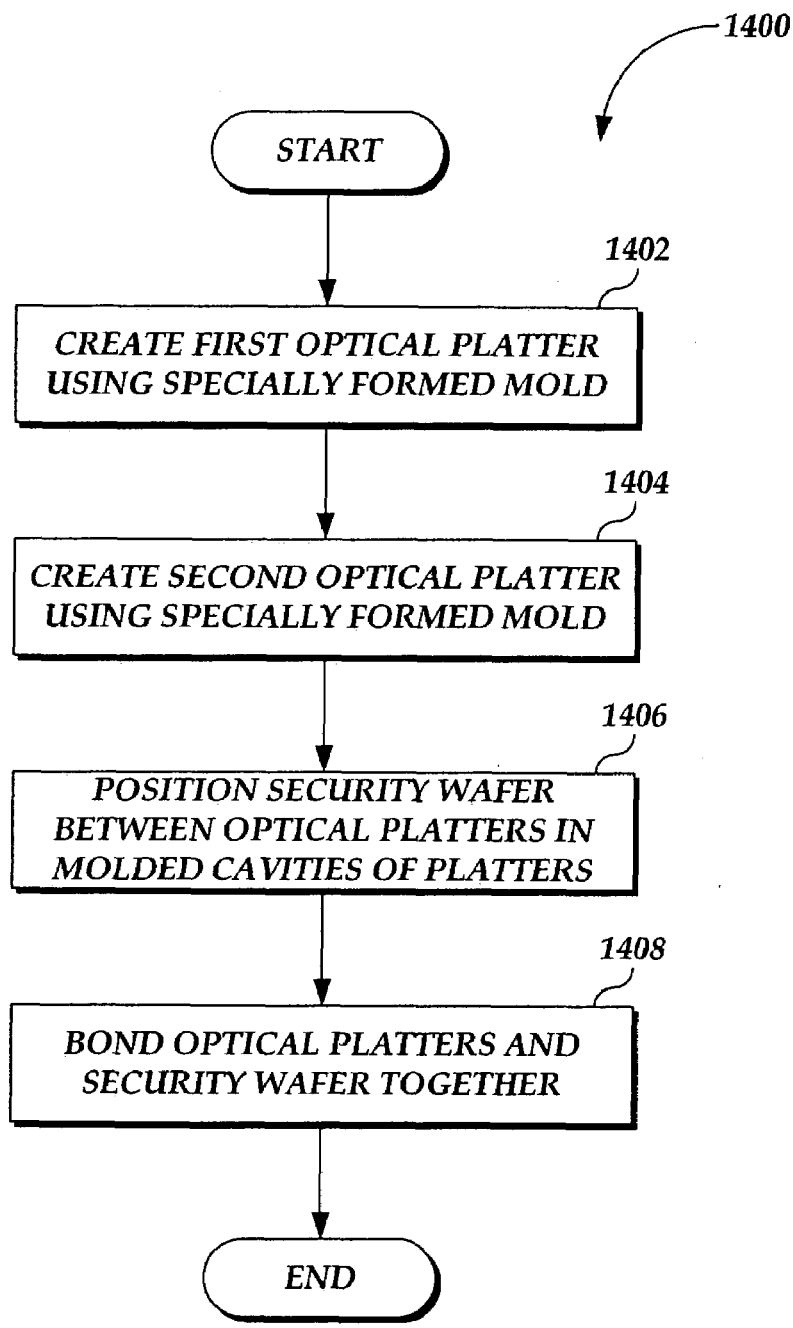
FIG. 14 is a flow diagram illustrating an exemplary routine for creating an optical disk embedded with a security wafer using specially formed optical platters, such as those described in regard to FIG. 8.

FIG. 14 is a flow diagram illustrating yet another alternative routine 1400 for creating an optical disk 102 embedded with a security wafer 104 using specially formed optical platters, such as platters 802 and 804 described in regard to FIG. 8. Beginning at block 1402, a first specially formed optical platter, such as platter 802 (FIG. 8), is created. As mentioned above, specially formed optical disks or platters may be created using a specially formed mold 1000 having a raised platform 1010, described above in regard to FIG. 10, or other methods, such as utilizing a special stamp within the mold. At block 1404, a second specially formed optical platter, such as platter 804 (FIG. 8), is created.

At block 1406, a security wafer 104 is positioned between the first and second specially formed optical platters such that the security wafer is located in the cavities of both the first and second optical platters. At block 1408, the first and second specially formed optical platters, and the security wafer, are bonded together. Bonding optical platters together is known in the art, and that same process may be used to bond the first and second specially formed optical platters and the security wafer 104. Thereafter, the exemplary routine 1400 terminates. Those skilled in the art will recognize that the optical platters and the resultant optical disk 102 embedded with a security wafer 104 will likely undergo additional processing steps, typical of preparing an optical disk for delivery to an end user, that are not described herein but are well known in the art.

While embodiments of the invention have been illustrated and described, including the preferred embodiment, it will be appreciated that various changes can be made therein without departing from the spirit and scope of the invention.

The embodiments of the invention in which an exclusive property or privilege is claimed are defined as follows:

1. A method for creating a counterfeit-resistant optical disk, comprising:
   positioning a security device in an optical disk mold, wherein the security device includes a spacing device attached to a surface of the security device such that the security device is prevented from being embedded flush with a surface of the formed optical disk;
   closing the optical disk mold; and
   forming an optical disk in the optical disk mold, thereby embedding the security device in the formed optical disk.

2. The method of claim 1, wherein the security device is a security wafer.

3. The method of claim 2, wherein positioning the security device in the optical disk mold comprises positioning the security device in the optical disk mold such that it is embedded concentrically in the formed optical disk.

4. The method of claim 3, wherein positioning the security device in the optical disk mold comprises positioning the security device on the center pin of the optical disk mold.

5. The method of claim 1, wherein the formed optical disk comprises an optical data storage area and a non-optical data storage area, and wherein the security device is positioned in the optical disk mold such that the security device is embedded in the non-optical data storage area.

6. The method of claim 1, wherein the security device is comprised of the same base material as the formed optical disk.

7. The method of claim 6, wherein the spacing device is comprised of the same base material as the formed optical disk.

8. The method of claim 7, wherein the spacing device is a ring concentrically located on the security device.

9. The method of claim 1, wherein the security device includes a security feature that is used to identify the formed optical disk as a non-counterfeited optical disk.

10. The method of claim 9, wherein the security feature comprises a plurality of microscopic taggants distributed on the security device.

11. The method of claim 9, wherein the security feature comprises a plurality of microscopic taggants distributed in the base material of the security device.

12. The method of claim 9, wherein the security feature is a photo-luminescent coating on the security device.

13. The method of claim 9, wherein the security feature is a polarized filter.

14. The method of claim 9, wherein the security feature is a radio frequency identification tag.

15. The method of claim 9, wherein the security feature is a hologram on the security device.

16. The method of claim 9, wherein the security feature is a serial number printed on the security device.

17. The method of claim 1, wherein the formed optical disk is a CD disk.

18. The method of claim 1, wherein the formed optical disk is a DVD disk.

* * * * *